United States Patent
Walls et al.

[11] Patent Number: 5,770,969
[45] Date of Patent: *Jun. 23, 1998

[54] CONTROLLABLE DECOUPLING CAPACITOR

[75] Inventors: Lloyd Andre Walls; Byron Lee Krauter, both of Austin, Tex.; Stanley Everett Schuster, Granite Springs, N.Y.

[73] Assignee: International Business Machines Corporation, Armonk, N.Y.

[*] Notice: The term of this patent shall not extend beyond the expiration date of Pat. No. 5,506,457.

[21] Appl. No.: 518,083

[22] Filed: Aug. 22, 1995

[51] Int. Cl.[6] .................................................. H03K 17/16
[52] U.S. Cl. .............................. 327/594; 307/98; 307/99; 307/129; 324/537; 324/548; 327/389; 361/306.2
[58] Field of Search .............................. 307/98, 99, 129; 324/537, 548; 327/111, 389, 594, 526, 551; 326/87

[56] References Cited

U.S. PATENT DOCUMENTS

| | | | |
|---|---|---|---|
| 3,621,347 | 11/1971 | Van Nielen | 317/235 |
| 3,657,602 | 4/1972 | Boehm et al. | 317/12 R |
| 3,772,097 | 11/1973 | Davis | 148/187 |
| 4,427,457 | 1/1984 | Carlson et al. | 148/1.5 |
| 4,825,106 | 4/1989 | Tipon et al. | 307/451 |
| 4,894,746 | 1/1990 | Mori et al. | 361/275 |
| 5,067,005 | 11/1991 | Michii et al. | 357/70 |
| 5,101,314 | 3/1992 | Yamaguchi | 361/15 |
| 5,148,391 | 9/1992 | Zagar | 365/96 |
| 5,153,450 | 10/1992 | Ruetz | 326/87 |
| 5,194,765 | 3/1993 | Dunlop et al. | 326/87 |
| 5,212,402 | 5/1993 | Higgins, III | 257/532 |
| 5,220,216 | 6/1993 | Woo | 326/87 |
| 5,394,294 | 2/1995 | Mei et al. | 361/275.3 |
| 5,506,457 | 4/1996 | Krauter et al. | 307/129 |

OTHER PUBLICATIONS

Sedra & Smith "Microelectronic Circuits", Saunders College Publishing, Philadelphia, 1991, p A–4.

*Primary Examiner*—Timothy P. Callahan
*Assistant Examiner*—Jeffrey Zweizig
*Attorney, Agent, or Firm*—Mark E. McBurney

[57] ABSTRACT

A decoupling capacitor and protection circuit is provided that will assist the power supply network in stabilizing the voltage near circuits that demand short rapid transitions in electrical current. The protection circuit also significantly reduces the amount of electrical current drawn by defective large area decoupling capacitors. An inverter stage controls a switching circuit connected in series with a decoupling capacitor. A feedback circuit is provided from the output of the capacitor to the switching circuit. If the capacitor goes bad, then a voltage is present on the feedback circuit and the switching circuit ensures that the output of the failed capacitor is presented with an open circuit so that the short circuit current flow through the capacitor is eliminated. In this manner, the integrity of the other circuits located near the failed capacitor will operate appropriately.

14 Claims, 1 Drawing Sheet

CONTROLLABLE DECOUPLING CAPACITOR

BACKGROUND OF THE INVENTION

The present invention relates generally to decoupling capacitors used in electronic devices to increase reliability by providing noise immunity. More specifically, the present invention is a circuit which controls the amount of electrical current flowing through a decoupling capacitor in order to prevent excess current in the event of a fault in the capacitor.

U.S. Pat. No. 3,772,097 shows a monolithic semiconductor structure wherein supply voltages are distributed between adjacent P and N type layers. The voltages are available for devices on the structure. Capacitance is provided between the P and N layers used to distribute the voltages.

U.S. Pat. No. 5,101,314 describes a protection system for a capacitor bank including a resistor connected in series between a connection cable, for connecting capacitor unit groups in parallel with one another, and a short circuit device provided for each group.

U.S. Pat. No. 3,657,602 discusses detection of incipient failure of a capacitor operating as a part of an induction furnace circuit by monitoring the capacitor for the presence of high-frequency signals generated by the capacitor as its dielectric material deteriorates. Decoupling capacitors are well known in integrated circuits for connecting power supply transmission lines to logic circuits in order to provide immunity from electrical noise caused by switching on the chip. It is not always possible to provide circuits with a robust power supply network where it is most needed. That is, the power supply circuit may be physically located some distance from the switching activity internal to the chip. A solution is to provide decoupling capacitors on the chip close to the switching activity.

Large area on-chip decoupling capacitors can be built to stabilize the voltage caused by internal switching on chips. A single large area capacitor is most desirable since optimal efficiencies can be achieved, in terms of capacitance per area of the chip. However, a large single capacitor would also be subject oxide defects that could not only defeat the effect of the capacitor but also damage the internal power supply rails (voltage and ground bus circuits). One solution is to divide the single large capacitor into multiple smaller capacitors. However, since many thin oxide capacitors would be placed on the chip, there is an increased probability that defects in the oxide will be present and short circuit several of the capacitors. This localized increase in electrical current through the shorted capacitors will cause nearby circuits to fail because of the reduced power supply voltage. Thus, a need exists for a way to limit or eliminate the current through the capacitors which may become shorted.

SUMMARY OF THE INVENTION

In contrast to the prior art, the present invention is a decoupling capacitor and protection circuit that will assist the power supply network in stabilizing the voltage near circuits that demand short rapid transitions in electrical current. The protection circuit also significantly reduces the amount of electrical current drawn by defective large area decoupling capacitors.

Broadly, the present invention provides a circuit which controls the amount of electrical current through a decoupling capacitor. An inverter stage controls a switching circuit connected in series with a decoupling capacitor. A feedback circuit is provided from the output of the capacitor to the switching circuit. If the capacitor goes bad, then a voltage is present on the feedback circuit and the switching circuit ensures that the output of the failed capacitor is presented with an open circuit so that the short circuit current flow through the capacitor is eliminated. In this manner, the integrity of the other circuits located near the failed capacitor will operate appropriately.

Therefore, in accordance with the previous summary, objects, features and advantages of the present invention will become apparent to one skilled in the art from the subsequent description and the appended claims taken in conjunction with the accompanying drawings.

DETAILED DESCRIPTION OF THE PREFERRED EMBODIMENT

Figure 1:
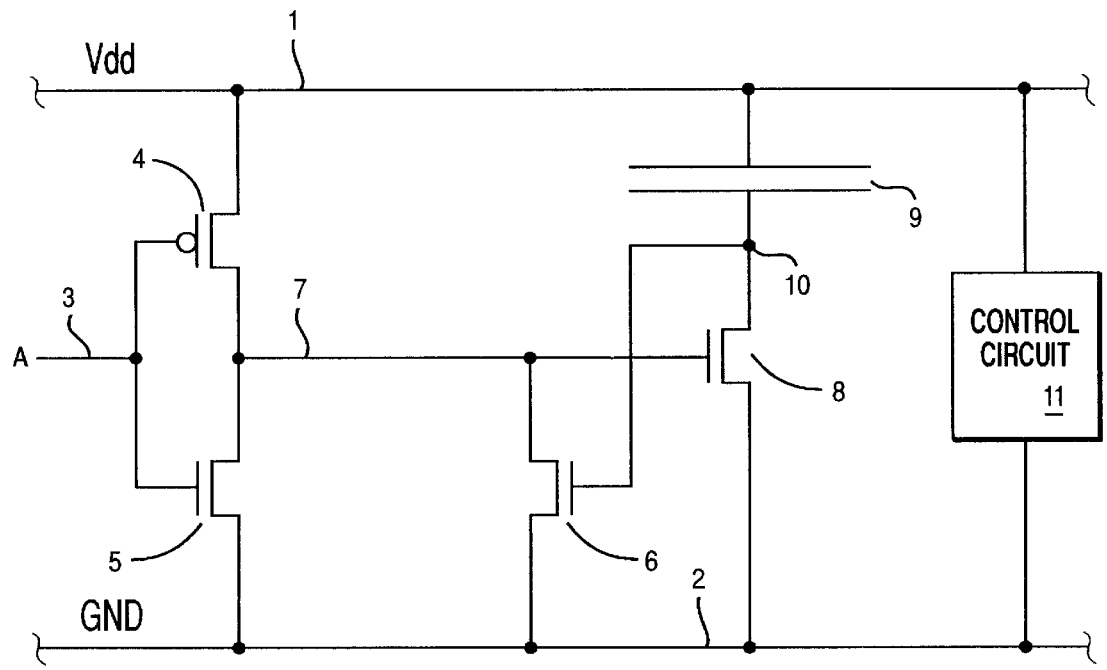
FIG. 1 is a schematic diagram of a first embodiment of the decoupling capacitor control circuit of the present invention.

Referring to FIG. 1, a decoupling capacitor control circuit is shown wherein a voltage supply rail 1 provides a voltage of Vdd to the circuit (Vdd is the power supply voltage, such as 5.0 v, 3.3 v, 2.5 v, or the like). Also shown is a voltage rail 2 which supplies a ground potential to the control circuit of the present invention.

Transistors 4 and 5 form an inverter circuit. Transistor 4 is a P-type device and transistor 5 is an N-type device. Those skilled in the art will understand that P-type transistors are turned on (conduct electrical current) when a logical 0 (absence of a voltage) present at the gate. Conversely, N-type transistors are turned on when a logical 1 (a voltage, i.e. Vdd) is present at the gate. Line (or node) 3 is used to input a control signal "A" to the inverter circuit of FIG. 1 which will act to connect, or disconnect the decoupling capacitor 9 as needed. It should be noted that signal "A" will be generated by a clock circuit, test circuit, or the like (not shown) which is used to control the times at which decoupling capacitor 9 is connected. The output of the inverter circuit formed by transistors 4 and 5 is input, via node 7, to the gate of an N-type transistor 8 which is connected between decoupling capacitor 9 and ground node 2. Another N-type transistor 6 is connected between node 7 and the ground rail 2. The gate of transistor 6 is connected to a node 10, formed at the connection of transistor 8 with decoupling capacitor 9. Further, a control circuit 11 is shown connected between Vdd and ground which performs some logical operation on the integrated circuit. Those skilled in the art will understand how a decoupling capacitor 9 will cause a stable voltage to be provided to circuit 11, thereby increasing its reliability, efficiency and speed.

First consider the operation of the circuit when the decoupling capacitor is good. During normal operation, control signal "A" at node 3 is a logical 0, and transistor 4 will be turned on, thereby pulling node 7 up to Vdd. Consequently, the voltage on node 7 will cause transistor 8 to be turned on and conduct electrical current. Of course the impedance of transistor 4 must be taken into account, i.e. any voltage drop across transistor 4 must be small enough to ensure that the voltage on node 7 is sufficient to cause transistor 8 to turn on. In other words, Vdd minus the voltage drop across transistor 4 must be greater than the voltage required to turn on transistor 8. Once transistor 8 is turned on, it will hold node 10 to ground. Thus, it can be seen that when a logical 0 is input at node 3, decoupling capacitor 9 is connected between Vdd and ground (via transistor 8) providing a stable power supply to control circuit 11. While transistor 8 is turned on, the voltage present at node 10 will be below the threshold voltage required to turn on transistor 6. Therefore, transistor 6 will be in a high impedance state (essentially an open circuit) and node 7 is maintained at a voltage level sufficient to keep transistor 8 turned on. In this state, no DC current passes through any of the devices of the control circuit of FIG. 1.

When it is desired for the decoupling capacitor 9 to be disconnected, a logical 1 is input as control signal "A" on node 3. This will cause transistor 5 to be turned on, pulling node 7 down to the reference voltage. As a result, transistor 8 will be turned off and decoupling capacitor 9 is disconnected from ground rail 2. Transistor 8 will remain turned off regardless of the voltage level present at node 10. For example, if zero (0) voltage is present on node 10, then transistor 6 will remain off and transistor 5 will pull node 7 to ground. And, if a voltage is present on node 10 sufficient to turn on transistor 6, then it will pull node 7 to ground. During the state when decoupling capacitor 9 is disconnected, the present invention makes certain that any leakage current from a defective capacitor 9 will not flow between Vdd and ground during any leakage testing of the chip. Thus, it can be seen that the present invention provides a means for testing leakage current in an integrated circuit with and without the leakage current of the decoupling capacitor.

Next, the operation of the present invention will be described when a faulty decoupling capacitor 9 is present in the circuit of FIG. 1. First, assume that decoupling capacitor 9 is connected, as described previously, i.e. a logical 0 is present at node 3 and transistor 8 is turned on. If a short circuit occurs within decoupling capacitor 9, the voltage at node 10 will rise. This is due to the reduction in the impedance across the capacitor. If the impedance, due to the defect in the capacitor, is low enough the voltage at node 10 will rise to a level exceeding the threshold voltage of transistor 6. This will turn on transistor 6 and consequently lower the voltage on node 7 (i.e. pull the voltage on node 7 towards ground). Node 10 can be considered a feedback loop, because it provides a signal back to transistor 6 which is based on the state of decoupling capacitor 9. As the feedback signal (voltage) increases the voltage on the gate of transistor 6, it will begin to conduct and reduce the voltage on node 7, which reduces the voltage on transistor 8 causing it to go into the high impedance state. When in the high impedance state, transistor 8 essentially presents an open circuit to node 10 disconnecting decoupling capacitor 9. The gate of transistor 6 will remain at a high voltage as long as capacitor 9 is defective. In this state, transistor 6 remains turned on, and maintains transistor 8 in its high impedance state by keeping node 7 at a voltage below the threshold of transistor 8.

It should be noted that when the capacitor is disconnected, as discussed above, a small current will flow through transistors 4 and 6. This current can be minimized by correctly sizing these transistors by altering their channel widths and length ratios. The current through the defective capacitor 9 has been inhibited by the high impedance of transistor 8 and replaced by a smaller current, which is allowed to flow through devices 4 and 6. Further, it is necessary that transistor 6 be strong (present low impedance when turned on) relative to transistor 4, which needs to be weak (present high impedance when turned on). This type of relationship will ensure that the voltage on node 7 can be lowered to a level sufficient to turn off transistor 8, i.e. below its threshold voltage. Conversely, if transistor 4 were strong and transistor 6 were weak, it would be difficult for the voltage on node 7 to be lowered, due to the low impedance presented by transistor 4 (node 7 would tend to be pulled towards Vdd). However, under normal conditions when capacitor 9 is good, node 10 will be low turning transistor 6 off, and thereby allowing node 7 to rise to Vdd for the case where node 3 is low and transistor 4 is on and transistor 5 is off. With node 7 at Vdd, transistor 8 will be on. This results in the impedance in series with decoupling capacitor 9 to be low, which is necessary for high speed operation.

Figure 2:
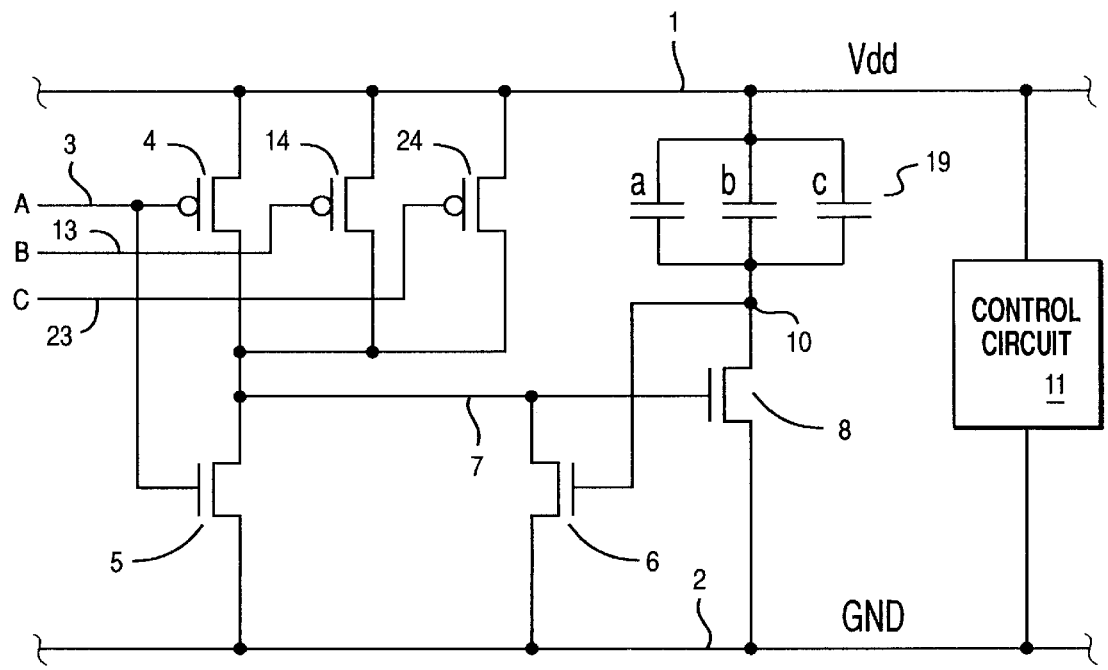
FIG. 2 is a diagram of another embodiment of the control circuit of the present invention.

Referring to FIG. 2, another embodiment of the present invention is shown. This circuit is similar to the one described above in conjunction with FIG. 1. In fact, the same reference numerals are used in FIG. 2, when they correspond to like components shown in FIG. 1. It can be seen that control signals "A", "B" and "C" are all provided as possible inputs to the circuit of FIG. 2. As noted above, it may be advantageous to "tune" the circuit by changing the impedance ratio of transistors 4, 14 and 24, relative to transistor 6. In this embodiment, transistors 4, 14 and 24 each have a different impedance when in a turned on state. Similar to FIG. 1, a logical 0 for control signal "A" will cause transistor 4 to turn on and the circuit will operate as discussed, above. However, a logical 0 which is generated by a clock circuit and input as signal "B" on node 13 will cause transistor 14 to be turned on, presenting a different impedance than transistor 4. Similarly, if a logical 0 is input as signal "C" on node 23, then transistor 24 will be turned on presenting yet another impedance, different from either transistor 4 or 14. It should be noted that, depending on the signal generation circuit, any combination of transistors 4, 14 and 24 can be turned on at any particular time giving the circuit of FIG. 2 great flexibility and utility for a chip designer. The same example described above with regard to transistors 4 and 6 can be applied equally to transistors 14 and 24, relative to transistor 6.

Also shown in the embodiment of FIG. 2 is a decoupling capacitor 19 which includes discrete capacitors "a", "b" and "c", each connected in parallel with one another between Vdd rail 1 and node 10. During normal operation, a logical 0 will be present on, for example, node 3 such that transistor 4 will be turned on. This will cause a voltage to be present on node 7, thus turning on transistor 8. In this state, decoupling capacitor 19 will be connected between Vdd rail 1 and ground rail 2, via transistor 8. If one of the individual capacitors, e.g. capacitor "a", fails, then a short circuit condition exists and the voltage at node 10 will be pulled toward Vdd. When the threshold voltage of transistor 6 is reached, it will turn on and pull node 7 toward ground, thereby turning off transistor 8 and disconnecting decoupling capacitor 19. In the event that previously shorted capacitor "a" becomes an open circuit, but does not provide any capacitance (e.g. the plates are damaged, but not shorted together) then capacitors "b" and "c" will begin to operate normally. In this case, the initial short circuit through capacitor "a" will be replaced with an impedance presented by capacitors "b" and "c" which will cause the voltage at node 10 to decrease. When the voltage at node 10 drops below the threshold voltage of transistor 6, it will then turn off. Correspondingly, the voltage on node 7 will be pulled towards Vdd through transistor 4 (which is still turned on). Once the voltage on node 7 exceeds the threshold of transistor 8, it will be turned on and reconnect the remaining capacitors "b" and "c" of decoupling capacitor 19. Thus, the present invention provides a means for the circuit of FIG. 2 to correct a fault condition by a failed one of the capacitive elements of decoupling capacitor 19, i.e. capacitor "a", when the fault condition ultimately results in an open circuit. However, if capacitor "a" remains shorted, then the entire decoupling capacitor 19 (including capacitors "b" and "c") will remain disconnected, since node 10 will be at Vdd and transistor 6 it turned on which maintains node 7 at ground and keeps transistor 8 turned off.

If capacitor "a" "heals" itself by opening without any damage to the capacitive element, then it is reconnected since it is considered a good capacitor once more. This connecting and reconnecting of decoupling capacitor 19 is accomplished without the need of any additional control logic, which would add complexity to the overall chip design.

Although certain preferred embodiments have been shown and described it should be understood that many changes and modifications may be made therein without departing from the scope of the appended claims.

We claim:

1. An integrated circuit having a plurality of discrete decoupling capacitors connected in parallel with their input connected to a voltage supply, comprising:

switching means for connecting an output of said plurality of decoupling capacitors to a reference potential;

feedback means for providing an input, based on a state of said plurality of decoupling capacitors, to said switching means, wherein said switching means disconnects said decoupling capacitors when said input indicates that at least one of said discrete decoupling capacitors has failed by causing an electrical short circuit; and means for controlling a voltage level of said input to said switching means in order to selectively connect said decoupling capacitors to said reference potential, and for determining whether said failed one of said discrete decoupling capacitors has changed to an open circuit condition, wherein a remainder of the plurality of discrete decoupling capacitors are reconnected to said reference potential and provide decoupling capacitance to said integrated circuit.

2. A circuit according to claim 1 wherein said plurality of decoupling capacitors are automatically disconnected when the impedance through the plurality of decoupling capacitors decreases below a predetermined level.

3. A circuit according to claim 2 wherein said plurality of decoupling capacitors are automatically reconnected when said impedance through said decoupling capacitors increases above said predetermined level.

4. A circuit according to claim 3 wherein said switching means comprises:

a first transistor for connecting said plurality of decoupling capacitors to the reference potential; and a second transistor for connecting the gate of said first transistor with said reference potential.

5. A circuit according to claim 4 wherein said means for controlling comprises:

a plurality of transistors having different impedances, each connected between a voltage supply and the gate of said first transistor; and means for turning on a predetermined combination of said plurality of transistors to cause the voltage level of said input to said switching means to vary.

6. A circuit according to claim 5 wherein an impedance of said combination of said plurality of transistors relatively greater than an impedance of said second transistor will cause said voltage level of said input to said switching means to approach the reference potential.

7. A circuit according to claim 6 wherein an impedance of said combination of said plurality of transistors relatively less than an impedance of said second transistor will cause said voltage level of said input to said switching means to approach a voltage of said power supply.

8. A method of controlling a plurality of discrete decoupling capacitors in an integrated circuit, said decoupling capacitors connected in parallel with their input connected to a voltage supply, comprising the steps of:

connecting, with a switching device, an output of said plurality of decoupling capacitors to a reference potential;

providing, by a feedback means, an input based on a state of said plurality of decoupling capacitors, to said switching means, wherein said switching device disconnects said decoupling capacitors when said input indicates that at least one of said discrete decoupling capacitors has failed by causing an electrical short circuit; and controlling a voltage level of said input to said switching device in order to selectively connect said decoupling capacitors to said reference potential, and determining whether said failed one of said discrete decoupling capacitors has changed to an open circuit condition, wherein a remainder of the plurality of discrete decoupling capacitors are reconnected to said reference potential and provide decoupling capacitance to said integrated circuit.

9. A method according to claim 8 wherein said step of controlling comprises the step of automatically disconnecting said plurality of decoupling capacitors when the impedance through the plurality of decoupling capacitors decreases below a predetermined level.

10. A method according to claim 9 wherein said step of controlling further comprises the step of automatically reconnecting said plurality of decoupling capacitors when said impedance through said decoupling capacitors increases above said predetermined level.

11. A method according to claim 10 wherein said step of connecting comprises the steps of:

providing a first transistor connecting said plurality of decoupling capacitors to the reference potential; and providing a second transistor connecting the gate of said first transistor with said reference potential.

12. A method according to claim 11 wherein said step of controlling further comprises the steps of:

providing a plurality of transistors having different impedances, each connected between a voltage supply and the gate of said first transistor; and turning on a predetermined combination of said plurality of transistors to cause the voltage level of said input to said switching means to vary.

13. A method according to claim 12 wherein an impedance of said combination of said plurality of transistors relatively greater than an impedance of said second transistor will cause said voltage level of said input to said switching means to approach the reference potential.

14. A method according to claim 13 wherein an impedance of said combination of said plurality of transistors relatively less than an impedance of said second transistor will cause said voltage level of said input to said switching means to approach a voltage of said power supply.

* * * * *